United States Patent [19]

Secretan

[11] Patent Number: 4,725,988

[45] Date of Patent: Feb. 16, 1988

[54] SYSTEM FOR DEPLOYING AN ARRAY OF SONAR PROJECTORS

[75] Inventor: Stanley Secretan, Leona Valley, Calif.

[73] Assignee: Allied Corporation, Morristown, N.J.

[21] Appl. No.: 717,199

[22] Filed: Mar. 28, 1985

[51] Int. Cl.[4] .......................... H04B 1/59; B63B 22/26

[52] U.S. Cl. .......................................... 367/4; 367/3; 367/6; 367/129; 441/33

[58] Field of Search .................... 367/3, 4, 6, 910, 173, 367/129; 441/33

[56] References Cited

U.S. PATENT DOCUMENTS

| | | | |
|---|---|---|---|
| 3,372,368 | 3/1968 | Dale et al. | 367/3 |
| 3,541,498 | 11/1970 | Dale et al. | 367/4 |
| 3,800,271 | 3/1974 | Stillman, Jr. | 367/4 |
| 4,020,514 | 5/1977 | Bourgeois | 367/4 |
| 4,075,600 | 2/1978 | Sims et al. | 367/129 |
| 4,208,738 | 6/1980 | Lamborn | 441/33 |
| 4,571,788 | 2/1986 | Bruengger | 367/4 |

*Primary Examiner*—Theodore M. Blum
*Assistant Examiner*—David Cain

[57] ABSTRACT

A system for deploying an array of sonar projector transducers includes a housing in which a plurality of disk shaped projectors are stacked, a pair of small diameter cables are reeled from a powered drum for tethering the projectors, the cables being anchored to the bottom projector, a pair of electrical conductors are connected to the projectors, each conductor constituting a series of sections interconnecting electrical connectors fastened to opposite sides of each projector, a centering ring attached to the bottom projector including a series of pressure responsive latches which serve to secure the array in the housing and to release the array upon its reaching a desired depth. Where the drum is actuated the stack is lowered with each projector being successively suspended by its pair of conductor sections, and each of the conductor sections is given a predetermined twist such that when the array is again returned to the housing the conductor sections are caused to form predetermined loops.

13 Claims, 4 Drawing Figures

SYSTEM FOR DEPLOYING AN ARRAY OF SONAR PROJECTORS

This invention relates to dipping sonar systems and more particularly to a deployment system for deploying and retracting an array of projector transducers from a housing forming part of a dipping sonar system.

In a dipping sonar, especially one carried by a helicopter, the transmitting or projector transducers and receiving transducers are contained in a unit which is suspended from the helicopter at the end of a cable. In the usual dipping sonar, the transmitting and receiving transducers are permanently fixed to the suspended unit. For some applications it is desired to create a system operating at a lower frequency, in which case the inherent geometry dictated by the chosen frequency requires a much larger array. In most cases such large, low frequency sonars are limited to ship-based or shore-based systems. It has been considered desirable, however, to provide a larger sonar for airborne use.

To provide a projector system for airborne sonar capable of operating at significantly lower frequencies than those presently employed, applicant has devised a system including an array of disk-shaped sonar transmitting transducers or projectors which is carried in a very compact assembly in a submersible housing and which is deployed to create an array of considerable length. This system includes a series of electrically interconnected projectors tethered together by means of small diameter cables which are anchored to the bottom or lower projector unit. A powered drum in the housing unwinds the cables to permit the projectors to drop away from the housing. Each projector separates from the next adjacent projector by a distance dictated by the length of the interconnecting electrical conductors which include strength members. Each projector disk includes diametrically spaced small ports or passageways to permit the projector disk to slide on the cables while, at the same time they are held in rough axial alignment by the cables. When it is desired to retrieve the array, the drum is energized and caused to begin reeling in the cables. The electrical conductors are attached to the projectors by means of connectors which are attached diametrically across each projector, and each connector is slightly circumferentially displaced from those on the next adjacent projector. The conductor sections between projectors are connected from the top end of one connector to the lower end of the projector immediately below it and the immediate effect of reeling in on the cables is to cause the bottom or lower projector to begin moving upward, causing the conductor sections between the two lower projectors to curl into a loop. When the lowest projector contacts the next lowest, the next conductor sections begin to form loops and this operation is continued until the entire array of projectors is stacked in the housing with interconnecting conductors arranged in a series of overlapping loops beside the stack and the electrical connectors neatly nested side by side although axially displaced. The conductor sections between the uppermost projector and the power source are unusually long which permits the top projector, when deployed, to be positioned a significant distance below the housing.

The lower or bottom projector is carried in a centering ring which has tapered sides mating with a corresponding partial conical internal surface at the bottom of the housing. This centers the array in the housing. Bellows-operated latches close to hold the projectors in the housing until the array reaches a desired depth which may be of the order of fifty feet, at which time the bellows will collapse sufficiently to release the centering ring from the housing and permit the array to be deployed. A hydraulic pressure responsive means is employed to operate a release on a detent in the housing which inhibits operation of the powered drum until the hydraulic system is energized. By these means premature or inadvertent deployment of the array is prevented.

From the foregoing it will be appreciated that the invention described herein provides an effective and practical means of deploying an underwater projector array of substantial size which can be incorporated into a housing small enough to be carried in a helicopter. The described arrangement for causing the conductor sections to form predictable loops effectively prevents tangling of the conductors or misalignment of the projectors. The projecting beam pattern may be modified by varying the number and spacing of the transducers as desired and/or through electrical power variations as will be understood by those skilled in the art.

The invention will now be described with reference to the accompanying drawings, in which.

Figure 1:
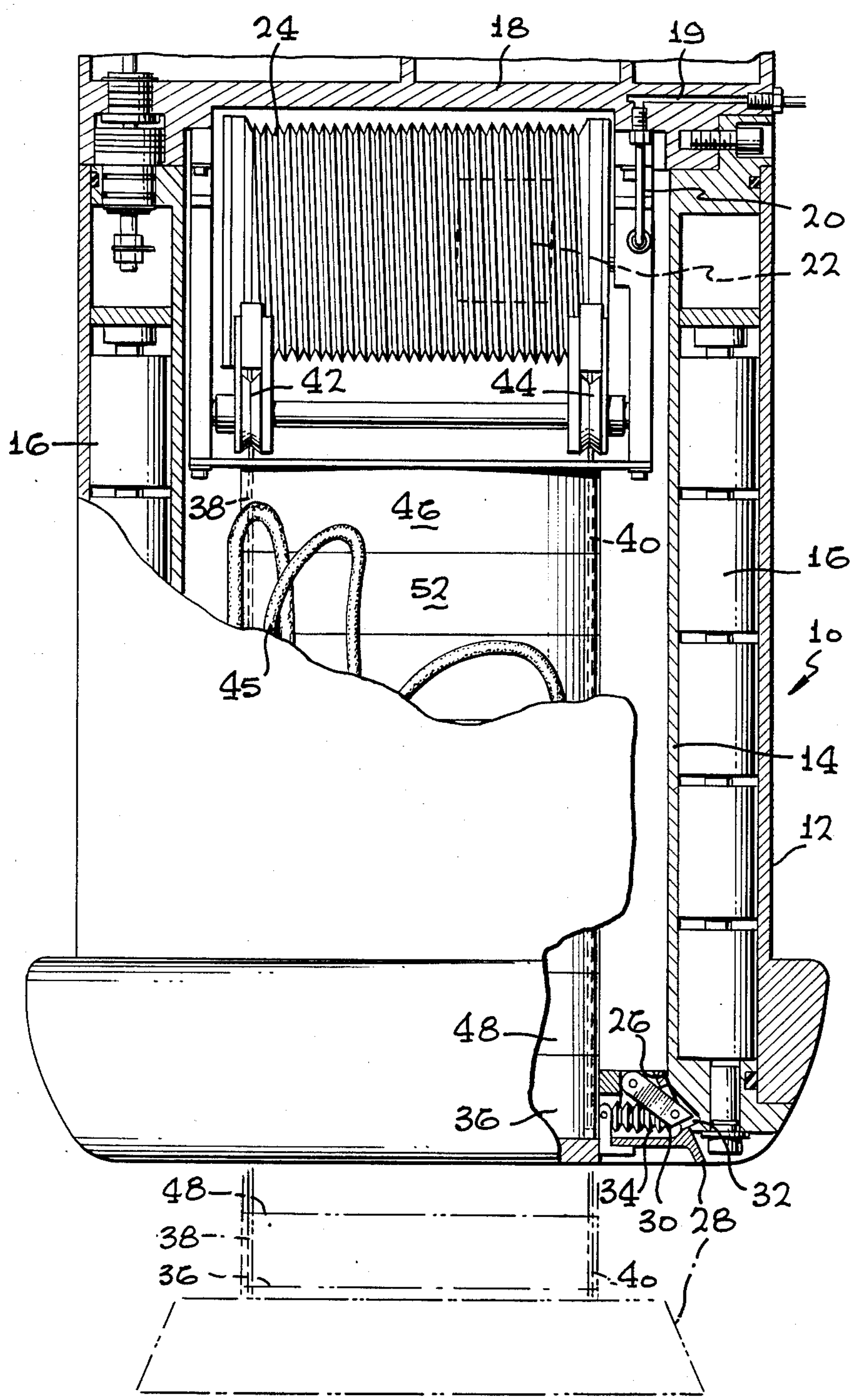
FIG. 1 is a sectional view of a part of an underwater transducer unit incorporating my invention.
Figure 2:
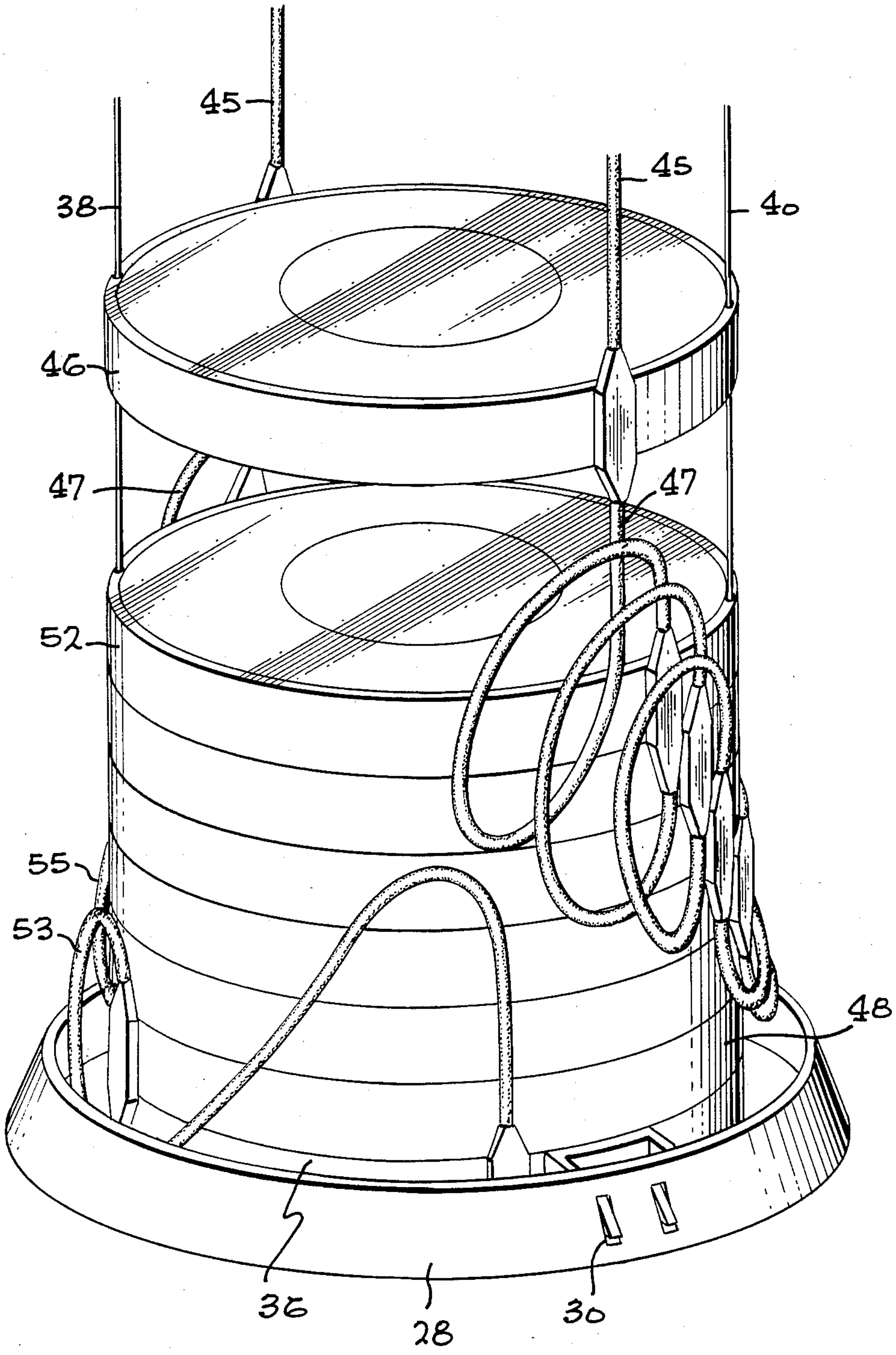
FIG. 2 is a perspective view of the transducer elements of FIG. 1 shown partly deployed.
Figure 3:
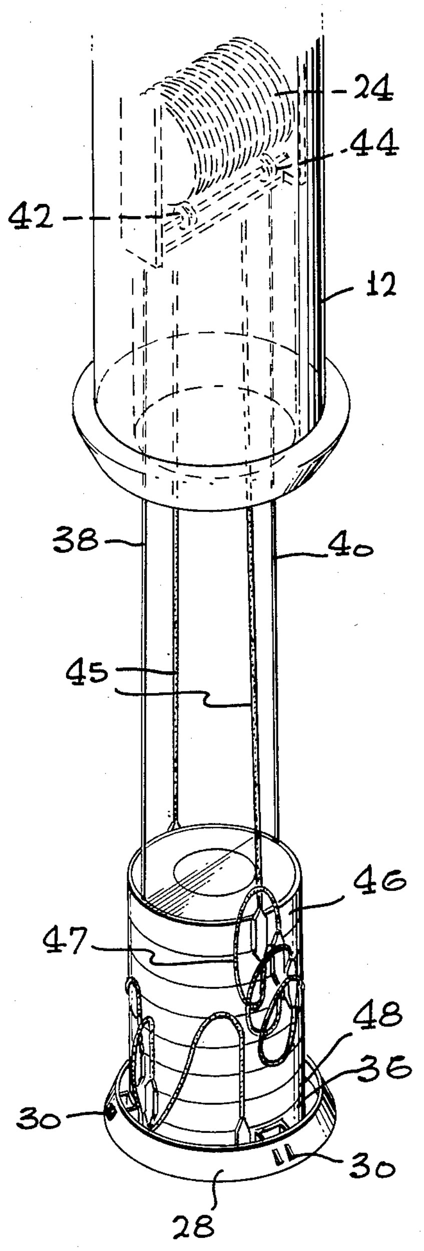
FIG. 3 is a perspective view, partly in section, of the transducer unit of FIG. 1 partly deployed.
Figure 4:
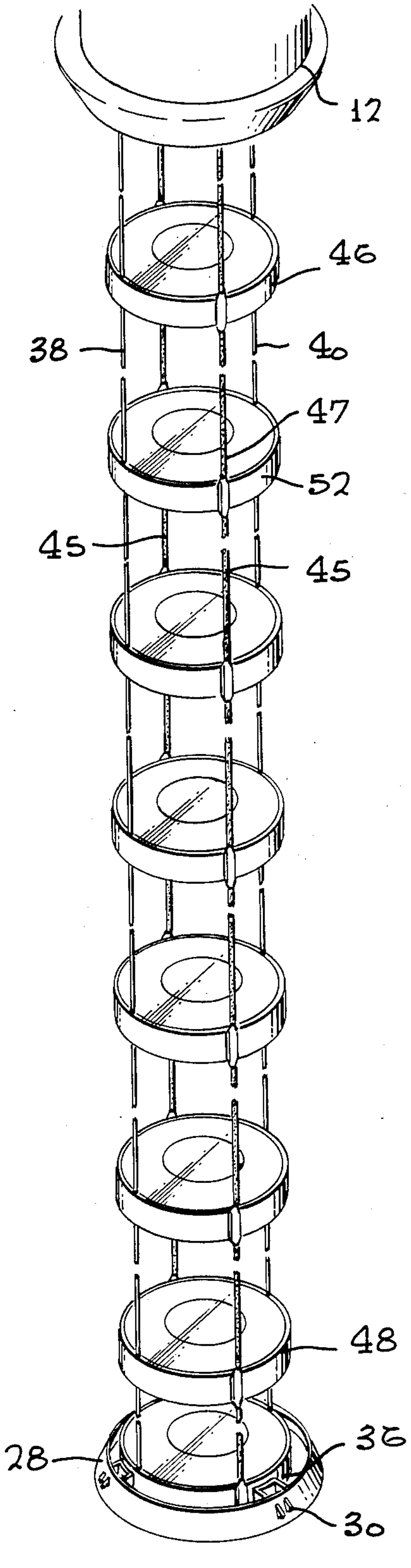
FIG. 4 is a perspective view showing part of the transducer housing with the projector array fully deployed.

Referring now to FIG. 1, numeral 10 designates a housing having an exterior wall 12, an interior wall 14 with a scaled chamber therebetween in which is stored a series of battery packs 16. At the top of housing 10, as shown, is a horizontal wall 18 which includes a hydraulic conduit 19, communicating with a pipe 20 which connect hydraulic fluid, under pressure, from a source, not shown, to a hydraulic motor 22 which drives a drum 24 in one direction or the other as dictated by control means not a part of this invention. Hydraulic motor 22 and its gearing are carried internally of drum 24. Wall 18 is sealed to the inner wall 14 and prevents water from reaching control means above itself since the chamber formed internally of wall 14 is free flooding. At the lower end of wall 14 is a tapered frusto-conical internal surface 26 which mates with an external surface of similar configuration forming part of a centering ring 28 which carries a plurality of pressure responsive latch means each comprising a pivoted latch member 30 which is normally carried in a recess 32 formed in surface 26. A pressure responsive bellows 34 is connected to latch member 30 such that, upon reaching a desired depth, the pressure collapses bellows 34 and pulls latch member 30 out of recess 32, thereby enabling ring 28 to be separated from housing 10. Ring 28 is attached to the bottom or lowest of a stack of disk-shaped transducer projectors 36. At the time the latch members 30 are actuated or at a later time as requested by an operator, fluid pressure to the hydraulic motor acts to drive drum 24 so that it rotates in a direction to wind out a pair of strong small diameter cables 38, 40 which are carried over a pair of pulley wheels 42, 44, respectively and pass through small ports at the edge of each projector disk before being anchored in the lowest or bottom projector disk 36. With latch members 30 released (there would normally be three such latches) and drum 24 turning to release cables 38, 40, projector disk 36 and ring 28 will drop away from housing 10, and all the projector disks will drop, with cables 38, 40 sliding through the ports in the projector disks until the upper projector disk 46 reaches a level such that its conductor sections 45 are fully stretched out (See FIGS. 2 and 3). At this point projector disk 46 stops and the remainder of the stack continues to drop until the next pair of conductor sections 47 are fully extended, when the next lower disk 52 is, or may be approximately 0.6 m. below disk 46. Disk 52 then stops and the remainder of the stack continues to drop with each pair of looped conductor sections successively being extended to their length with each projector disk reaching a position as dictated by the length of the conductor section between itself and the disk immediately above it. These conductor lengths are related to the frequency of the signal projected, as will be appreciated by those skilled in the art. When the cables 38, 40 have reeled out to the desired length, all the projector disks will be deployed and, in applicant's preferred embodiment, essentially evenly spaced between the conductor sections (See FIG. 4). In this view the electrical conductor section and the cables 38 and 40 are shown cut off to indicate substantially greater length between the projector disks. This is required because of the scale of the drawing. Also, the conductor sections are straight as shown in FIG. 4 because of the weight of the transducer disks, but the cables 38 and 40 will be slightly twisted because of the displacement of the connectors circumferentially relative to the cables, which is not shown in this view, but which will be quite clear from FIGS. 2 and 3.

When it is desired to retrieve the array, the hydraulic motor 22 is energized to cause drum 24 to rotate in the proper direction to reel in cables 38 and 40. Since the cables slide through the ports in the projector disks, only the lowest projector disk 36 and the centering ring 28 move upward at first. As they move upward the conductor sections 53 attached to projector disk 36 form loops. With further upward movement, projector disk 36 makes contact with projector disk 48 and begins to carry it upwardly, causing the conductor sections 55 attached to disk 48 to begin forming loops. By giving each conductor section a desired amount of predetermined twist, which may be as much as 360° from one end to the other, the sections will form predictable, essentially vertically standing loops. The electrical connectors attached to the disk 48 are displaced circumferentially a small distance from the electrical connectors attached to projector disk 36. In this manner as the cables 38, 40 are reeled in, one projector disk after another is added to the stack with each successive pair of conductor sections forming loops so that they stand essentially vertically with each pair of electrical connectors being displaced circumferentially a short distance from its neighbor such that they do not interfere with stacking of the projector disks.

From the foregoing, it will be understood that the applicant has devised a deployment system for a sonar system which may be stored in a very compact assembly but which can readily and predictably be deployed to provide an array of considerable size. While applicant's preferred arrangement calls for an even spacing of the projectors, there may be occasions when some variation may be desired. Some care may be required in individual different arrays to determine the amount of twist to be put in each conductor section to provide assurance that they form predictable loops which do not tangle or interfere with stacking of the projectors, or with entry of the stack into the housing.

I claim:

1. A sonar system designed for repeated deployment into a body of water and retrieved therefrom including a housing, an interconnected array of disk-shaped projector transducers which are carried in said housing in a stacked configuration, and electrical conductors including connectors for supplying power to said transducers, characterized in that said system includes a deployment means for said transducers comprising a plurality of small diameter cables fastened to the bottom one of said transducers and fed through openings near the edges of the other of said transducers but unattached thereto, a powered drum to which said cables are attached, said electrical conductors including strength members and being in sections between said electrical connectors, said sections being of substantially equal length corresponding to the desired distance between said transducers to insure that said transducers as deployed remain essentially horizontal and parallel to each other and when said transducers are stacked forming loops of said sections from the bottom of an upper electrical connector to the top of the next lower connector;

said electrical connectors being connected diametrically across said transducers with each said electrical connector being circumferentially displaced a small distance from the electrical connectors of adjacent transducers so that as said transducers are stacked in said housing, said electrical connectors nest side by side but are axially displaced;

and means for actuating said drum.

2. A sonar system as set forth in claim 1 wherein latch means are incorporated into said housing and means responsive to a fluid pressure representing a desired substantial depth are included for operating said latch means to permit said bottom transducer to drop away from said housing.

3. A sonar system as set forth in claim 1 wherein said bottom transducer is fastened to a centering ring, latch means are carried in said centering ring for holding said centering ring against said housing, and pressure responsive means are included for operating said latch means in response to said housing reaching a desired depth.

4. A sonar system as set forth in claim 1 wherein the electrical conductor sections connected to the top transducer are substantially longer than the other conductor sections to permit said top transducer, when deployed, to be displaced a significant distance below said housing.

5. A sonar system as set forth in claim 1 wherein said small diameter cables are reeled from a storage drum, small pulleys are located on a shaft parallel with the axis of said drum and said cables pass over said pulleys and the top transducer conductor sections are connected to a power source and are substantially longer than the other conductor sections to permit said top transducer, when deployed, to be displaced a significant distance below said housing.

6. A sonar system as set forth in claim 1 wherein detent means are incorporated in said housing for preventing said powered drum from operating and pressure responsive means is included to release said detent means when said housing reaches a desired depth.

7. A sonar system designed for repeated deployment into a body of water and retrievable therefrom including a housing, an interconnected array of disk-shaped projector transducers which are carried in said housing in a stacked configuration, and electrical conductors including connectors for supplying power to said transducers, characterized in that said system includes a deployment means for said transducers comprising a centering ring attached to and movable with the bottom one of said transducers and including a plurality of small diameter cables connected to said bottom transducer and fed through openings near the edges of the other of said transducers but unattached thereto, and a powered drum to which said cables are attached, said electrical conductors being connected diametrically across said transducers by means of said electrical connectors, said electrical connectors being circumferentially displaced a small distance relative to the connectors for adjacent transducers so that when said transducers are stacked in said housing, said electrical connectors nest side by side but axially displaced, each section of said electrical conductors between said electrical connectors including strength members and being of substantially equal length corresponding to the desired distance between said transducers and forming loops from the bottom end of an upper connector to the top end of the next lower connector such that when said drum is actuated, said centering ring and bottom transducer drop away from said housing carrying said cables and said transducers move downwardly, extending said conductor sections between said transducers to form an array of essentially horizontal parallel transducers; and when said drum is actuated to retrieve said transducers, said cables are wound on said drum, said centering ring and bottom transducer are pulled toward said housing and said conductor sections again form said loops as said transducers are stacked in said housing.

8. A sonar system as set forth in claim 7 wherein detent means are incorporated in said housing for preventing said powered drum from operating and pressure responsive means is included to release said detent means when said housing reaches a desired depth.

9. A sonar system as set forth in claim 7 wherein said latch means includes a pressure responsive bellows for actuating said latch means to release said centering ring from said housing when said bellows reaches a desired substantial depth.

10. A sonar system as set forth in claim 7 wherein the electrical conductor sections connected to the top transducers are substantially longer than the other conductor sections to permit said top transducer, when deployed, to de displaced a significant distance below said housing.

11. In a sonar system including an interconnected array of disk-shaped projector transducers, electrical conductors including electrical connectors for supplying power to said projector transducers, and a housing for retaining said projector transducers in a stacked configuration;

a deployment system for deploying said projector transducers and for returning said transducers into said housing comprising a centering ring fastened to and movable with the bottom one of said transducers at the bottom of said housing, a plurality of small diameter cables connected to said bottom one of said transducers and movable through openings near the edges of the other said transducers, a drum to which said cables are attached, and motor means for turning said drum, said electrical conductors being connected diametrically across each of said transducers by means of electrical connectors, the electrical connectors for adjacent transducers being circumferentially displaced a small distance relative to said cables so that when said transducers are stacked in said housing, said electrical connectors nest side by side although axially displaced, each section of said electrical conductors between adjacent said electrical connectors including strength members and being of equal length corresponding to the desired distance between said adjacent transducers and forming loops from the bottom end of an upper connector to the top end of the next lower connector such that when said drum is actuated, said centering ring and bottom transducer drop away from said housing carrying said cables and said transducers move downwardly, successively extending said conductor sections between said transducers to form an array; and when said drum is actuated to retrieve said transducers, said cables are wound on said drum, said centering ring and bottom transducer are pulled toward said housing and said conductor sections again successively form said loops as said transducers are stacked in said housing.

12. A sonar system as set forth in claim 11 wherein said release means includes means responsive to water pressure at a desired substantial depth for actuating said latching means to release said centering ring from said housing.

13. A sonar system as set forth in claim 11 wherein the length of said conductor sections is related to the frequency of the signal projected.

* * * * *